United States Patent
Bosco et al.

(10) Patent No.: US 7,876,972 B2
(45) Date of Patent: *Jan. 25, 2011

(54) FILTERING OF NOISY IMAGES

(75) Inventors: Angelo Bosco, Giarre (IT); Arcangelo Ranieri Bruna, San Cataldo (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,740

(22) Filed: Aug. 18, 2009

(65) Prior Publication Data

US 2010/0040303 A1 Feb. 18, 2010

Related U.S. Application Data

(62) Division of application No. 11/148,850, filed on Jun. 8, 2005, now Pat. No. 7,580,589.

(30) Foreign Application Priority Data

Jun. 8, 2004 (EP) .................................. 04102596

(51) Int. Cl.
*G06K 9/40* (2006.01)
(52) U.S. Cl. ..................... 382/261; 382/260; 382/275
(58) Field of Classification Search ................ 382/260, 382/261, 275
See application file for complete search history.

(56) References Cited

U.S. PATENT DOCUMENTS

| | | | | |
|---|---|---|---|---|
| 3,971,065 A | | 7/1976 | Bayer | ........................... 358/41 |
| 5,065,444 A | * | 11/1991 | Garber | ........................ 382/275 |
| 5,805,216 A | * | 9/1998 | Tabei et al. | .................. 348/246 |
| 6,496,605 B1 | * | 12/2002 | Osa | .............................. 382/268 |
| 7,260,272 B2 | * | 8/2007 | Lin et al. | ..................... 382/275 |
| 7,352,909 B2 | * | 4/2008 | Guleryuz | ..................... 382/254 |
| 7,580,589 B2 | * | 8/2009 | Bosco et al. | ................. 382/275 |
| 2005/0248671 A1 | * | 11/2005 | Schweng | ..................... 348/246 |

FOREIGN PATENT DOCUMENTS

| | | |
|---|---|---|
| EP | 1100260 | 5/2001 |
| EP | 1394742 | 3/2004 |

OTHER PUBLICATIONS

Ozkan et al., Adaptive Motion-Compensated Filtering Of Noisy Image Sequences, IEEE Transactions On Circuits And Systems For Video Technology, IEEE Inc. New York, US, vol. 3, No. 4, Aug. 1, 1993.

(Continued)

*Primary Examiner*—Bhavesh M Mehta
*Assistant Examiner*—Stephen R Koziol
(74) *Attorney, Agent, or Firm*—Lisa K. Jorgenson; Allen, Dyer, Doppelt, Milbrath & Gilchrist, P.A.

(57) ABSTRACT

A method for correcting an image from defects and filtering from Gaussian noise corrects each pixel of the image when it is considered defective and filters it from Gaussian noise in one-pass. The one-pass improves the speed for performing the correcting and filtering. The drawbacks associated with choosing incompatible defect correction and filtering operations are overcome.

20 Claims, 15 Drawing Sheets

OTHER PUBLICATIONS

Muneyasu et al., A New Edge-Preserving Smoothing Filter Based On Fuzzy Control Laws And Local Features, Circuits And Systems, 1998, ISCAS '98, Proceedings of the 1998 IEEE International Symposium on Monterey, CA, USA, May 31-Jun. 3, 1998, New York, NY, USA, May 31, 1998, pp. 239-242.

Jin et al., Modeling And Analysis Of Soft-Test/Repair For CCD-Based Digital X-Ray Systems, IEEE Transactions On Instrumentation And Measurement IEEE USA, vol. 52, No. 6, 2002, pp. 1713-1721.

Hashimoto et al., Directional Difference-Based Switching Median Filters, Electronics & Communications In Japan, Part III—Fundamental Electronic Science, Scripta Technica, New York, US, vol. 85, No. 3, Part 3, 2002, pp. 22-32.

* cited by examiner

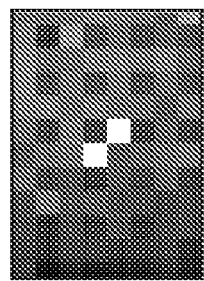
FIG. 3
(PRIOR ART)
$$P_0 \; P_1 \; P_2$$
$$P_3 \; P \; P_4$$
$$\underbrace{P_5 \; P_6 \; P_7}$$
FIG. 4
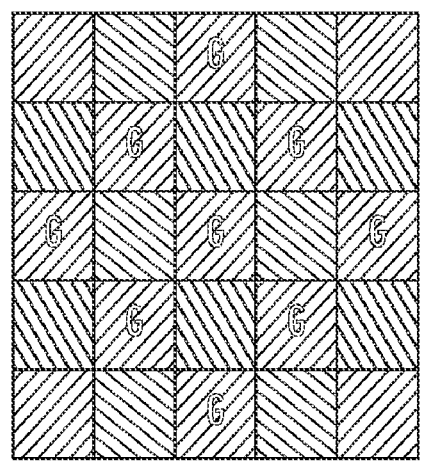
FIG. 5

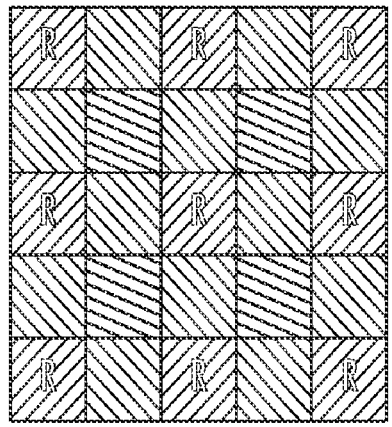
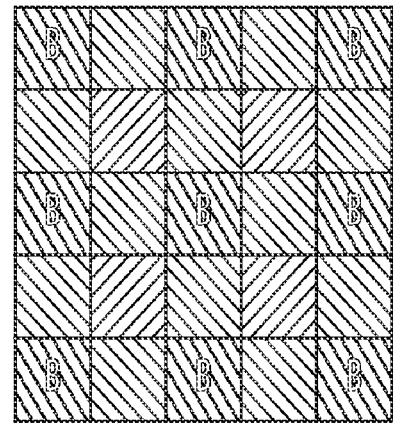
FIG. 6A  FIG. 6B
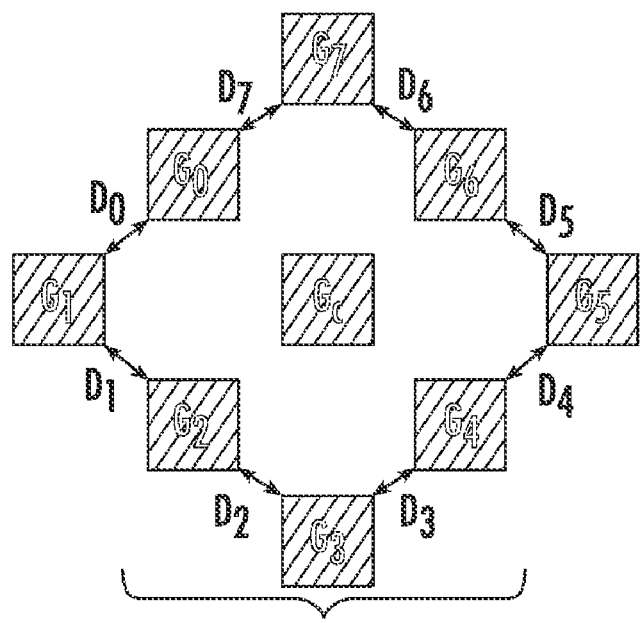
FIG. 7

ORIGINAL NOISY IMAGE

FILTERED IMAGE

CROPPED AND MAGNIFIED PORTION OF THE ORIGINAL NOISY IMAGE.

CROPPED AND MAGNIFIED PORTION OF THE FILTERED IMAGE.

FILTERING OF NOISY IMAGES

RELATED APPLICATION

This application is a divisional of Ser. No. 11/148,850 filed Jun. 8, 2005 now U.S. Pat. No. 7,580,589, the entire disclosure of which is hereby incorporated herein by reference.

FIELD OF THE INVENTION

The invention relates to image processing, and more precisely, to a method for determining a defective pixel in an image, a method for correcting the defective pixel in the image and a method for filtering a noisy pixel in the image, and a corresponding relative hardware implementation of these methods.

BACKGROUND OF THE INVENTION

Digital cameras generate an array of pixels that represents an image acquired by the cameras. A very diffused format for an array of pixels is the Bayer mosaic pattern layout, which is shown in FIG. 1. In a Bayer pattern, each pixel contains information that is relative to only one color component, for instance, red, green or blue. Typically, the Bayer pattern includes a green pixel in every other space, and in each row, either a blue or a red pixel occupies the remaining spaces.

As shown in FIG. 1, there are rows that alternate green G and red pixels R, and rows that alternate green G and blue pixels B. Therefore, a Bayer image is substantially a mosaic of red, green and blue pixels, where there are twice as many green pixels as red or blue pixels. This array can accurately represent an image because the human eye is more sensitive to the green data than either the red or blue.

To better show the features of the invention, the ensuing description will be referred to Bayer images, but the same considerations apply to other kinds of images, such as black and white images or any other type of image detected by a color filter sensor of a camera.

CMOS image sensors generate images that could be affected by different kinds of noise. The main causes of badly acquired pictures are Gaussian noise, defective pixels and white tailed noise.

With Gaussian noise the assumption of AWGN (additive white gaussian noise) is quite common and it normally refers to the noise randomly covering the image data, usually generated by many factors such as dark currents, high gain values etc. With defective pixels spikes, dead pixels and generally flawed pixels are located at the same locations of the image sensor and they are always set to flawed values. In particular, dead pixels are set to values close to zero, while spikes are set to near saturation or to saturation values.

White tailed noise, this is a particular kind of noise, visible in particular under low light conditions. It causes unusually bright impulsive pixels (spikes) located at random positions of the image. The difference with the above mentioned spiked or dead pixels is due to the fact that it is not possible to build a map to track them because they always appear in random locations. Furthermore, spikes generated by this noise can be close to each other. This makes the correction process of these pixels particularly tough as more than one spike could be present in the filter mask at the same time.

In this description, pixels corrupted by white tailed noise, spiked and dead pixels will be referred as defective pixels. Consequently, this attributes to this expression a broader meaning than that commonly attributed to it in literature.

Noise level typically increases in low light conditions because the image signal has to be amplified. This is normally achieved by increasing gains in the imaging pipeline that strengthen the signal so as to yield an acceptable picture. Obviously, the gain values are applied to the image signal and to the superimposed noise as well. Hence, one cannot boost the image signal without pushing up the noise level too.

In digital cameras a color filter is placed on top of the imager. Thus each pixel is sensitive to one color component only. A color reconstruction algorithm interpolates the missing information at each location and reconstructs the full RGB image.

Noisy Bayer data appears as shown in FIG. 2. The intensities of pixels deviate from their correct value by some constant drawn from a Gaussian distribution. Furthermore, a certain number of pixels have completely flawed values. These pixels are called outliers. They usually manifest as impulsive noise spread over the Bayer data and appear as bright white or dark black points.

Especially under low light conditions, spikes can be close to each other, as shown in FIG. 3. Arrangements of noisy pixels such as the one shown in FIG. 3 are particularly tough to remove. One of the two spikes could be preserved and considered in the final weighted average for removing Gaussian noise. Furthermore, dead pixels could also be present at random locations.

Dead pixels may also appear at random locations of the Bayer data array. A pixel whose flawed value is not set to near zero or near saturation values is treated as corrupted by Gaussian noise or as normal non-extreme outlier by a Duncan filter [5].

Techniques have been developed to reduce the effects of noise to generate pleasant images in every lighting condition. Typically, the noise superimposed all over the image signal is assumed to be Gaussian distributed. This has enabled the realization of powerful filters that enhance image quality significantly [4], [6]. Unfortunately noisy pixels exist for which the assumption of Gaussian noise is not valid at all. An example of non-Gaussian noise is represented by the defective dead or spiked pixels in the image.

These defective pixels are removed by considering a map denoting their position and treating them accordingly using a defect correction algorithm. A Gaussian noise reduction filter and a defect correction algorithm efficiently remove noise. Thus, one approach for getting rid of both Gaussian noise and defective pixels consists in treating the two noises separately using two different cascaded filters. Two processing modes are possible:

i) scanning the image array twice, removing white tailed noise together with defective pixels, and Gaussian noise at each pass; and ii) scanning the image once, processing each pixel by a different filter for removing white tailed noise together with defective pixels, and Gaussian noise.

A drawback of scanning twice the image is the slowness of the correction process of the image, while treating a scanned pixel with two filters is faster, but the filters should be adequately chosen for preventing the generation of artifacts or deletion of details of the image. Therefore, a fast method for correcting defective pixels and filtering Gaussian noise that does not generate artifacts and preserves details is needed.

SUMMARY OF THE INVENTION

The invention provides a method for deciding if there is a defective pixel in a set of pixels of a digital image or in a sequence of digital images that is dead, including spiked pixels even if they are generated by white tailed noise.

The method comprises choosing a set of pixels, with each pixel having two closest neighbor pixels belonging to the set; calculating the absolute value of differences of intensity of pairs of neighbor pixels; and excluding the presence of any defective pixel when no more than one of the absolute values is larger than the pre-established threshold, otherwise deciding whether or not there is a defective pixel in function of the comparison.

Preferably, no pixel is identified as defective if more than two of the above differences out of eight are larger than the threshold, in order to preserve texture portions of the image.

In one aspect of the invention, it is possible to identify the defective pixel and to correct it, or it is possible to correct a pair of pixels containing the defective pixel without locating exactly which one is defective. In the first case, the defective pixel is located by identifying the pixels for which the absolute values of both the differences between its intensity and the intensity of one and the other neighbor pixel of the set surpass the pre-established threshold.

In the other case, corresponding to a preferred embodiment of the invention, the largest absolute value of the above mentioned differences and the pair of pixels used for calculating it are identified. Then the correct intensities of this pair of pixels are evaluated with the median intensity among the intensities of the two pixels of the pair and of a pixel neighbor to them.

According to another aspect of the invention, the intensity of an identified defective pixel may be corrected by substituting its intensity with the intensity of one of the neighbor pixels of the set or with a combination thereof.

Each pixel of an image of a sequence of images may be corrected and filtered from Gaussian noise by selecting pixels neighbor to it; checking whether there is or not a defective pixel among the neighbor pixel by calculating the above mentioned differences, and evaluating its correct intensity as previously explained; checking whether the central pixel is defective and eventually correcting its intensity, generating a corrected pixel; and filtering from Gaussian noise the corrected pixel by substituting its intensity with a weighted sum of the intensities of the neighbor pixel and the pixel itself.

With this method, each pixel is corrected from eventual defects and filtered from Gaussian noise in a single scanning. Moreover, the method is very straightforward and there are no problems of compatibility between the defect correction and the Gaussian noise filtering.

A hardware device for performing a Gaussian noise filtering is also disclosed. The methods may be easily implemented with a software computer program.

BRIEF DESCRIPTION OF THE DRAWINGS

The various aspects and advantages of the invention will be even more evident through a detailed description referring to the attached drawings, wherein:

FIG. 3 is a magnified view of a portion of FIG. 2 showing two adjacent impulsive defective pixels;

FIG. 4 shows a typical 3×3 selection window according to the present invention;

FIG. 5 shows a diamond shaped selection window for green pixels of a Bayer image according to the present invention;

FIGS. 6a and 6b show rectangular windows for red and blue pixels of a Bayer image according to the present invention;

FIG. 7 shows how to calculate intensity differences between neighbor pixels of a Bayer image selected by a diamond shaped window according to the present invention;

DETAILED DESCRIPTION OF THE PREFERRED EMBODIMENTS

Figure 1:
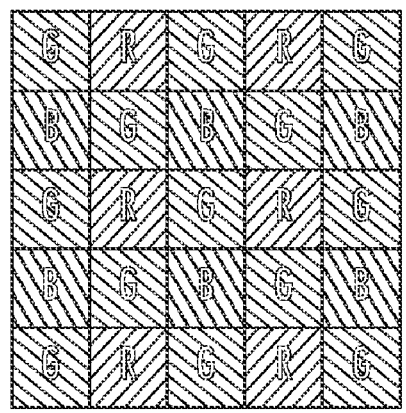
FIG. 1 is a sample array of pixels detected by a Bayer color filter according to the prior art.
Figure 2:
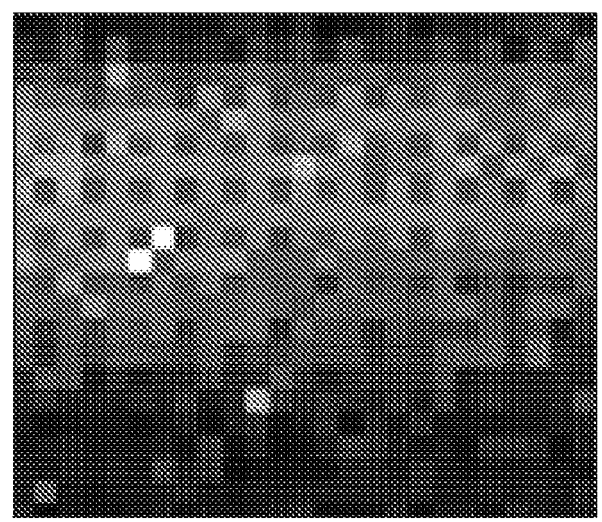
FIG. 2 is a sample noisy Bayer data according to the prior art.

A selection window commonly used for filtering noise corrupting pixels of an image is the rectangular 3×3 selection window illustrated in FIG. 4. In order to include 9 valid pixels of a same color (green, red or blue) of a Bayer image, the dimensions of the 3×3 window have to be enlarged to 5×5 and two selection windows are considered: a diamond shaped mask for green pixels G as shown in FIG. 5, and a rectangular mask for red R and blue B pixels as shown in FIGS. 6a and 6b, respectively.

In the ensuing description of the different embodiments of the invention, reference will be made to a set of nine green pixels selected with a diamond shaped window over a static Bayer image, though the same considerations apply also in case of a rectangular selection window for selecting red or blue pixels, or in case the selected pixels of the set are chosen among different images of a sequence of images.

To summarize, the selection window selects a set of nine pixels of the same color of a Bayer image, one of which is located at the center of the window and will be referred as a central pixel, while the remaining eight pixels will be referred as peripheral pixels.

To remove the noise described above, the algorithm for correcting pixels are designed to take into account the possibility that the central pixel, and probably one of the peripheral pixels, are outliers.

As usually done in image filtering processes, the image array is scanned in a top-down manner starting from the top leftmost pixel. Depending on the color of the pixels to be processed, the appropriate selection window (rectangular or diamond shaped) is chosen having the pixel to be processed as a central pixel. In so doing, the pixels of the image borders cannot be processed by the selection window, thus they are copied in an output buffer without being processed.

Let us suppose that defective green pixels of an image are sought. A set of pixels to be processed is selected by a diamond shaped window, such as shown in FIG. 7. In the set of selected pixels, there are eight peripheral pixels of the selection window $G_0, \ldots, G_7$, and a central pixel $G_C$. Moreover, each peripheral pixel has two neighbor peripheral pixels.

The first step to be performed is to identify whether there is or not a defective pixel among the peripheral pixels of the selected set. Differences related to the peripheral pixels are computed:

$$D_0=|G_0-G_1|; D_1=|G_1-G_2|; D_2=|G_2-G_3|; D_3=|G_3-G_4|;$$

$$D_4=|G_4-G_5|; D_5=|G_5-G_6|; D_6=|G_6-G_7|; D_7=|G_7-G_0|.$$

The order in which these differences are calculated has no relevance, thus a clockwise elaboration is equivalent to a counter-clockwise one. Moreover, the computation of the differences may start from any peripheral pixel.

Each difference $D_i$ is compared with a threshold that preferably is a multiple $K\sigma$ of the estimated noise standard deviation $\sigma$. The constant value K has to be determined according to the range of differences that can be considered to be safe. Tests showed that a suitable value is K=4 for 8 bit-precision Bayer data, though the value K may be different for satisfying other specific requirements.

When comparing these differences with the threshold $K\sigma$, the number of differences that are less than or equal to $K\sigma$ is counted. If six differences out of eight are smaller than the threshold and the two differences larger than $K\sigma$ are consecutive, then among the peripheral pixels $G_0, \ldots, G_7$ is likely an outlier. In fact, the presence of an outlier affects two consecutive differences out of the eight computed ones that are the differences between the intensity of the outlier and the intensities of one and the other neighbor peripheral pixel.

According to the invention, a pixel is identified as defective when the differences between its intensity and the intensity of one and the other neighbor peripheral pixel surpass the threshold $K\sigma$.

A very straightforward way of identifying such a defective pixel will now be described. Let $D_i$ be the maximum difference. As $D_i=|G_i-G_{i+1}|$, then $D_i$ is univocally associated to two pixels, namely $G_i$ and $G_{i+1}$. If the outlier is a spike, the defective pixel is the pixel that has the maximum intensity between the intensities of the pixels $G_i$, and $G_{i+1}$.

Figure 8:
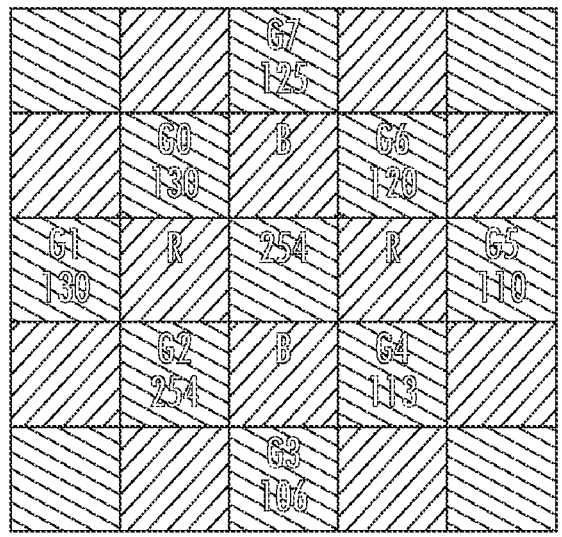
FIG. 8 is a sample intensity distribution of pixels of FIG. 7 with two spiked pixels.

FIG. 8 shows an example in which two spikes appear in the same working window. The computed differences are:

| $D_0$ | $D_1$ | $D_2$ | $D_3$ | $D_4$ | $D_5$ | $D_6$ | $D_7$ |
|---|---|---|---|---|---|---|---|
| 0 | 124 | 128 | 7 | 3 | 10 | 5 | 5 |

It is evident that two ($D_1$ and $D_2$) of the above differences are significantly greater than the others. $D_1$ and $D_2$ indicate that a pixel is likely to be defective among in $G_1$, $G_2$ or $G_3$.

The maximum difference $D_2$ indicates that the pixels to be considered are $G_2$ and $G_3$. One of them is probably a spike and has to be removed. According to an embodiment of the invention, the defective pixel is the pixel having the largest intensity max($G_2$, $G_3$), i.e., max(254, 106); the spike is $G_2$=254.

At this point, the correct intensity of the spike is to be estimated. Reasonable choices are:

i) the intensity of $G_2$ is the mean intensity between $G_1$ and $G_3$;

ii) the intensity of $G_2$ is the intensity of $G_1$; and iii) the intensity of $G_2$ is the intensity of $G_3$.

The option i) is discarded because it requires a division, which is computationally heavy. The options ii) and iii) are identical under a computational point of view. Thus, for sake of example, option iii) is chosen, though similar considerations apply for option ii).

The above described steps are very straightforward to be implemented and very effective if the defective peripheral pixel is a spiked pixel. When the defective peripheral pixel is a dead pixel, the method steps previously described need further refinements. This situation is considered below by way of an example.

Figure 9:
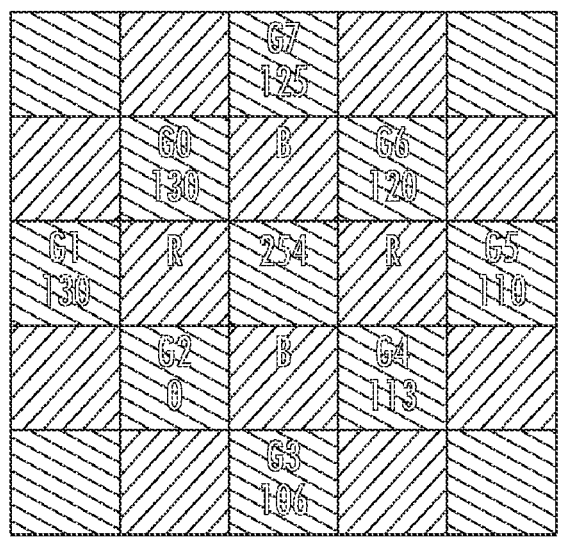
FIG. 9 is a sample intensity distribution of pixels of FIG. 7 with a dead pixel.

Let us consider the sample working window of FIG. 9. The differences $D_0, \ldots, D_7$ are:

| $D_0$ | $D_1$ | $D_2$ | $D_3$ | $D_4$ | $D_5$ | $D_6$ | $D_7$ |
|---|---|---|---|---|---|---|---|
| 0 | 130 | 106 | 7 | 3 | 10 | 5 | 5 |

The two consecutive differences larger than the threshold $K\sigma$ of interest are $D_1$ and $D_2$, and $D_1$ is the maximum difference. Unfortunately, $D_1$ is not a spike but it is a dead pixel. By using the previous method steps, the intensity of $G_1$ would be estimated with the intensity of $G_2$, but this is not correct because this would "kill" the pixel $G_1$ too.

According to an embodiment of the method of the invention, a very straightforward way of estimating the correct intensity of a peripheral defective pixel includes considering the two pixels $G_i$ and $G_{i+1}$ that generate the maximum difference $D_i$ and a neighbor pixel $G_{i-1}$. Then the median value of the intensity of these three pixels is considered to be the correct intensity of both pixels that generate the maximum difference.

In the previous example the pixels that generate the maximum difference $D_1$ are the pixels $G_1$ and $G_2$. According to the invention, the correct intensities of the pixels $G_1$ and $G_2$ are the median intensity of the pixels $G_0$, $G_1$, and $G_2$, that is 130.

By taking the median value, the intensity of the dead pixel will never be chosen as a suitable value. It is worth noticing that evaluating the correct intensity of the two peripheral pixels that generate the maximum difference with the median intensity among the two pixels and another neighbor peripheral pixel is an effective expedient even for peripheral spiked pixels. Indeed, it is easy to understand that even the intensity of a spiked pixel will never be chosen as a median intensity.

Another key aspect to consider is that edges of objects represented in the image are not deleted because the previous modifications to the peripheral pixels of the chosen set of pixels are applied only if two consecutive differences (that are two differences involving a same peripheral pixel) out of eight are larger than the threshold Kσ. According to an embodiment of the invention, if less than 6 differences out of 8 are smaller than the threshold Kσ, then the area is considered as texture and no pixel is identified as defective.

After an eventual peripheral dead or spiked pixel has been identified and its correct intensity has been evaluated, the central pixel P, which is the pixel to be corrected and filtered from Gaussian noise, is processed. According to the invention, the intensity of the central pixel is corrected and filtered from Gaussian noise as a function of the correct intensities of the peripheral pixels. That is, the intensities of the peripheral pixels not recognized as defective and the estimated correct intensity of an eventually present defective peripheral pixel.

Three alternatives are possible: 1) the central pixel P is correct; 2) the central pixel P is affected by Gaussian noise; and 3) the central pixel P is an outlier (dead or spike). To better understand the method of the invention for correcting the central pixel P and for filtering Gaussian noise from all the pixels of the set, let us refer to the particular case of FIG. 10.

According to a preferred embodiment, three intervals centered on the intensity P of the central pixel and on the noise increased P+σ and decreased P−σ version thereof are considered, wherein σ is the standard deviation of the noise corrupting the image. The noise biased intensities P−σ and P+σ are considered because the central pixel can be corrupted by Gaussian noise.

As an alternative, the noise increased P+σ and decreased P−σ version of the central pixel P are obtained by increasing or reducing, respectively, the intensity of the central pixel by a fraction or a multiple of the standard deviation σ, or only the central pixel P and the noise increased P+σ or decreased version P−σ thereof can be considered.

Preferably, three intervals of increasing wideness $2*Th_1$, $2*Th_2$ and $2*Th_3$ are chosen and their values are set to 2σ, 4σ and 6σ, respectively. For sake of clarity, in FIG. 10 only the intervals $2*Th_3$ for P−σ and P are represented with a dash and dot line. Of course, there can be even more or less than three intervals and they can be assigned a value that is a fraction or another multiple of the standard deviation σ.

Let P be the intensity of the central pixel P of the selection window and $P_0, \ldots, P_7$ the intensities of the peripheral pixels; the following values are computed for $i=0, \ldots, 7$:

$$d_i = |P - P_i|$$
$$dm_i = |(P - \sigma) - P_i|$$
$$dp_i = |(P + \sigma) - P_i|$$
$$\text{and: } DC = \sum_{i=0}^{7} d_i; DM = \sum_{i=0}^{7} dm_i; DP = \sum_{i=0}^{7} dp_i.$$

The minimum sum of differences among DC, DM and DP is computed: MinDiff=min(DC, DM, DP). Then: If MinDiff is DC, the intensity P is considered. If MinDiff is DM, the intensity P−σ is considered. If MinDiff is DP, the intensity P+σ is considered.

Figure 10:
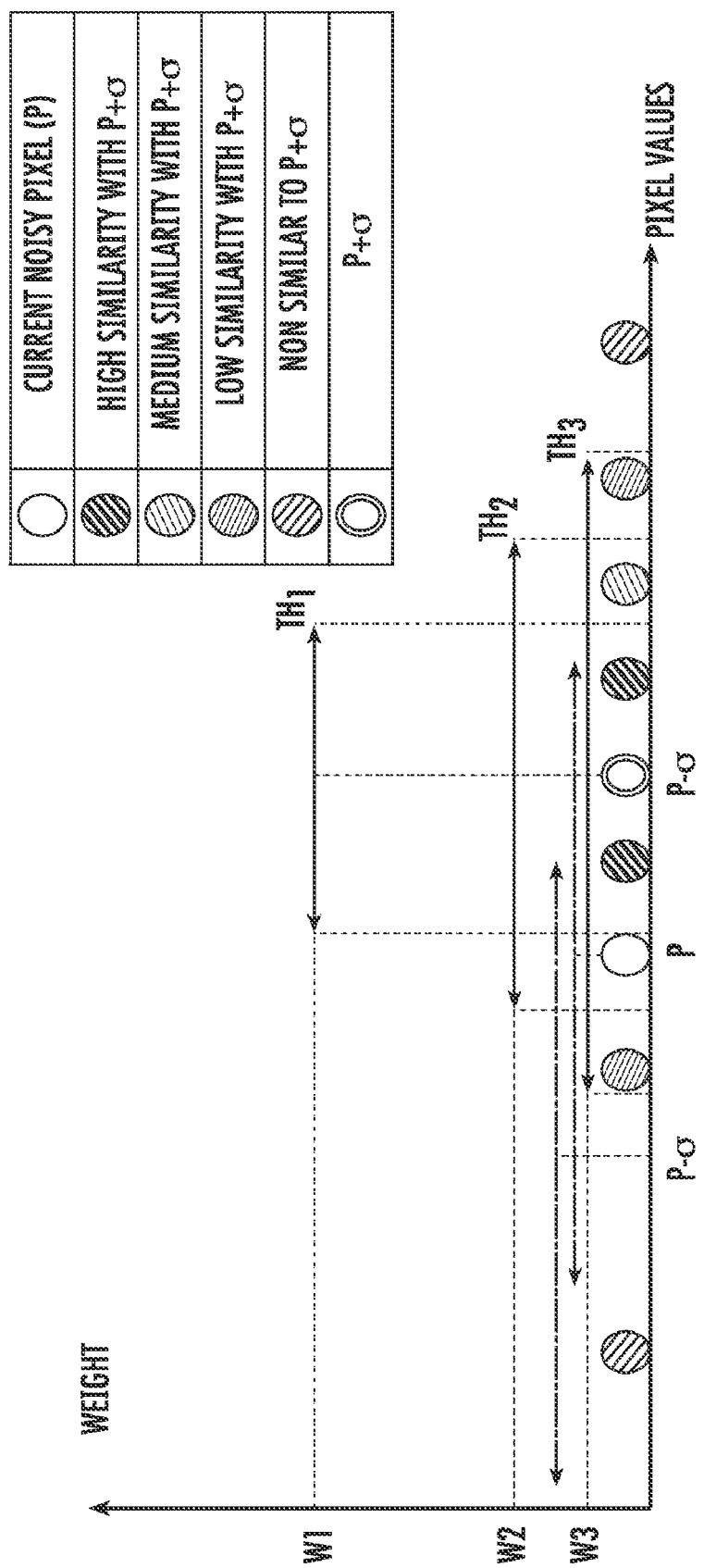
FIG. 10 shows how to assign weights to pixels according to the present invention.

In the example of FIG. 10, the intensity P+σ is considered. A problem arises when the central pixel P is an outlier. In fact, if P is a dead pixel belonging to a bright area or if it is a spike belonging to a dark area, then even the interval $2*Th_3$ might not contain any pixel at all. A sample situation of a central spiked pixel is shown in FIG. 11, wherein the eight peripheral pixels are represented with a green circle, while the central pixel and its noise increased or decreased versions are represented with a white circle with a red border.

In the case of a dead central pixel P located in a non-black area, sometimes even if P+σ is considered no pixels is included in the widest interval $2*Th_3$. This situation is shown by way of an example in FIG. 12.

Figure 11:
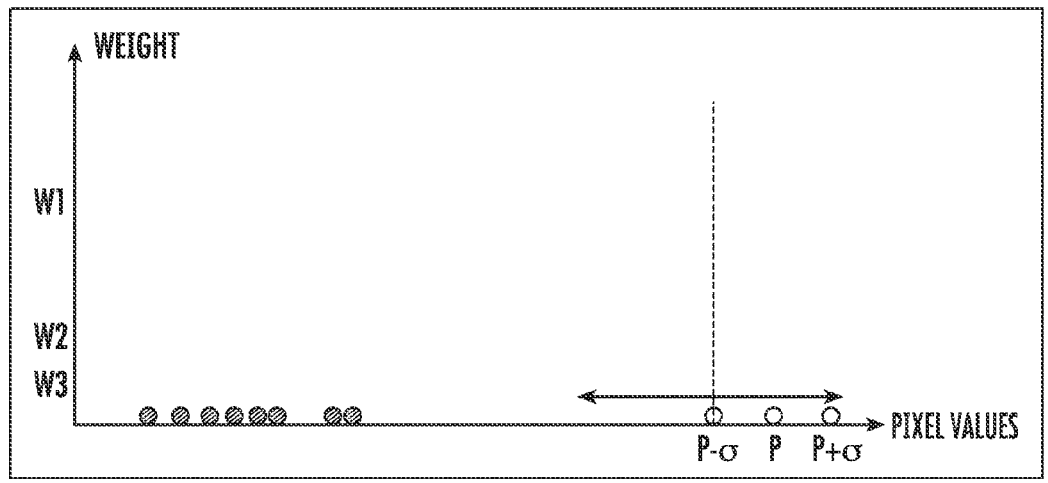
FIG. 11 is a diagram of intensities of a spiked central pixel of a selection window surrounded by non-spiked peripheral pixels according to the present invention.
Figure 12:
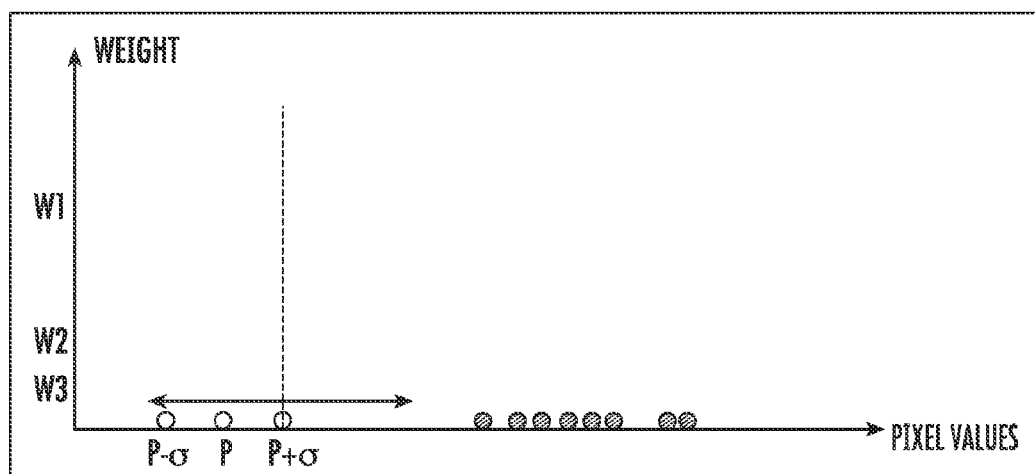
FIG. 12 is a diagram of intensities of a dead central pixel of a selection window surrounded by non-dead peripheral pixels according to the present invention.

By referring to FIGS. 11 and 12, the following observations hold. If P is a spike, then the intensity P−σ will be considered as the one closest to the majority of the other pixels, because P−σ is closer to the other pixels if compared to P's and P+σ's distance. A similar consideration holds in the case in which P is a dead central pixel; in this case P+σ is closer to the majority of the other pixels.

This suggests the way in which an outlier occurring in the central position could be identified. Each time the interval centered on P−σ(P+σ) is selected, then P−σ(P+σ) cannot be automatically identified as an outlier because DM or DP could be the minimum without P being an outlier. Hence, the criteria for extreme outliers identification is reinforced with further constraints as follows:

i) if DM is chosen and P−σ is greater (brighter) than the maximum intensity among peripheral pixels, then the central pixel is a spike to be corrected;

ii) if DM is chosen but P−σ is smaller (darker) than or equal to the maximum intensity among peripheral pixels, then the central pixel is not recognized as an outlier;

iii) if DP is chosen and P+σ is smaller (darker) than the minimum intensity among peripheral pixels, then the central pixel is a dead pixel to be corrected;

iv) if DP is chosen and P+σ is greater (brighter) than the minimum intensity among peripheral pixels, then the central pixel is not recognized as an outlier; and v) if DC is chosen then P is supposed to be affected by Gaussian noise.

When the central pixel is judged to be an outlier, it must be substituted accurately; an improper change of the central pixel P may very likely generate strange artifacts in the image, especially along edges of represented objects.

As previously stated, the central pixel is recognized as an outlier in cases i) and iii); its substitution could be coarsely implemented using the two following rules:

a) if the central pixel in the selection window is identified as a spike, changing its value using the maximum intensity (brightest) among peripheral pixels; and b) if the central pixel in the selection window is identified as a dead one, changing its value using the minimum intensity (darkest) among peripheral pixels.

This choice is fast and produces good results, but it is not the best approach because some artifacts could arise in the image. The best approach that has been determined after many tests, comprises performing the following steps:

a) if the central pixel in the selection window is identified as a spike, changing its value using the average of all the peripheral pixels; and b) if the central pixel in the selection window is identified as a dead one, changing its value using a weighted average of the four darkest peripheral pixels. Specifically, if $P_0$, $P_1$, $P_2$ and $P_3$ are the darkest peripheral pixels in ascending order (i.e., $P_0$ is the darkest and $P_3$ is the brightest of the darkest pixels), then changing the central pixel by substituting the following value:

$$(V_0*P_0+V_1*P_1+V_2*P_2+V_3*P_3)/(V_0+V_1+V_2+V_3),$$

where $V_0=8$, $V_1=4$, $V_2=2$, $V_3=2$ are one of the possible choices for the weighting coefficients.

Once the central pixel P has been corrected because it was a spike or a dead pixel, it is filtered from Gaussian noise, as explained below. Depending on which value between DC, DM and DP is the minimum, the values $d_i$, $dm_i$ or $dp_i$ are chosen. Then peripheral pixels in the interval of amplitude $2*Th_1$ are assigned a weight $W_1$ (high similarity), e.g., $W_1=8$; peripheral pixels comprised in the interval of amplitude $2*Th_2$ but not in the interval of amplitude $2*Th_1$ are assigned a weight $W_2$ (medium similarity), e.g., $W_2=2$; peripheral pixels comprised in the interval of amplitude $2*Th_3$ but not in the interval of amplitude $2*Th_2$ are assigned a weight $W_3$ (low similarity), e.g., $W_3=1$; and peripheral pixels outside the largest interval $2*Th_3$ are considered non-similar to P and are assigned a null weight.

The intensity of the noise-free version of the central pixel P is obtained as a weighted sum of the intensity of the central pixel weighted with the largest weight $W_1$, with the intensities of the peripheral pixels weighted with the weights previously assigned to them.

The above method steps for correcting and filtering the central pixel P from noise are repeated for each pixel of an image to be filtered but the border pixels, which are simply copied in an output buffer, generate a defect-free and noise-free image.

With the method of the invention, each pixel of the image is processed for correcting it and filtering Gaussian noise in a single pass. Therefore, it is not necessary to scan twice the image for correcting defects and filtering Gaussian noise, but these two operations are performed with a single scanning on each pixel without generating artifacts or having problems of compatibility between the defects correction and the noise filtering operations.

Figure 13:
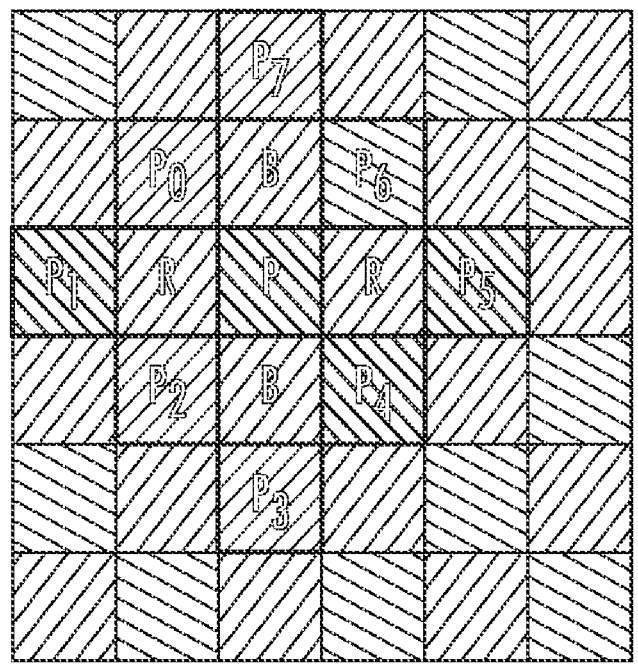
FIG. 13 shows a diamond shaped selection window with two adjacent dead pixels according to the present invention.
Figure 14:
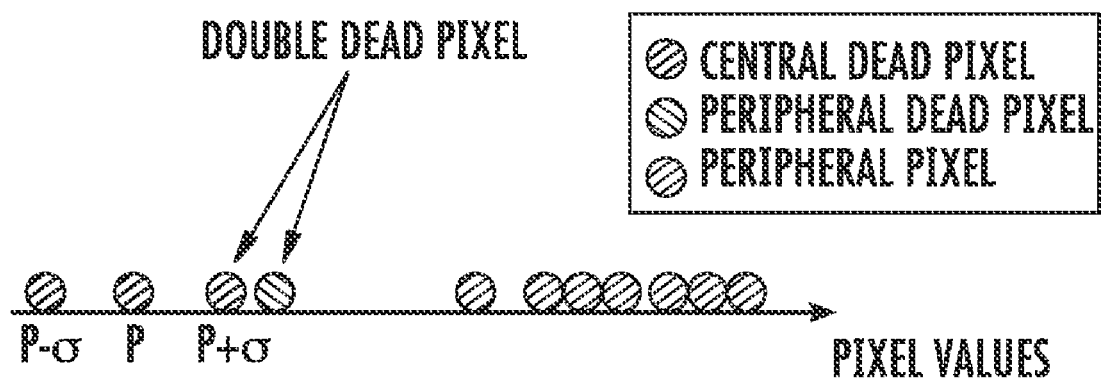
FIG. 14 is a diagram of intensities of pixels of FIG. 13.
Figure 15:
FIG. 15 is a diagram of the intensities of pixels of FIG. 13 after the dead pixel of the peripheral pixels has been corrected.
Figure 16:
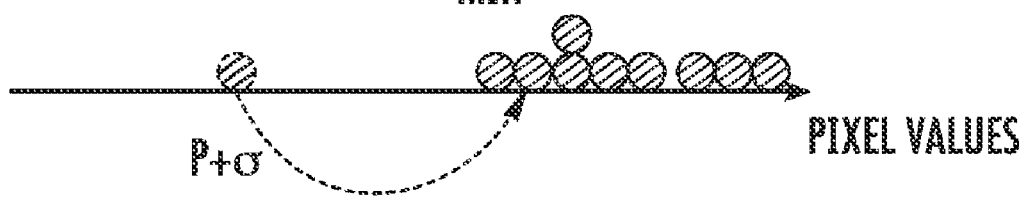
FIG. 16 is a diagram of the intensities of pixels of FIG. 13 after both the peripheral and central dead pixels have been corrected.

FIG. 13 shows pixels selected with a diamond shaped selection window, two of which are dead pixels. According to the method of the invention for identifying defective pixels, the peripheral dead pixel $P_4$ is identified, as schematically shown in FIG. 14. Then, as shown in FIG. 15, the correct intensity of the peripheral pixel $P_4$ is estimated with the median value of the intensity of pixels $P_3$, $P_4$ and $P_5$. The central pixel is identified as a dead pixel and its intensity is corrected with the average of intensities of its neighbor pixels.

Figure 17:
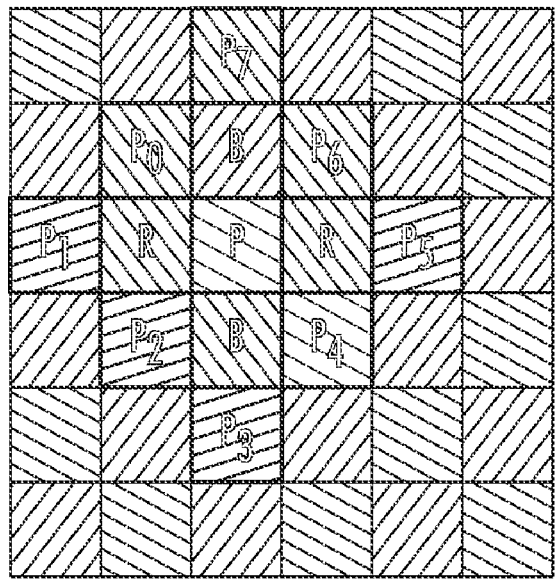
FIG. 17 shows a diamond shaped selection window with two adjacent spiked pixels according to the present invention.
Figure 18:
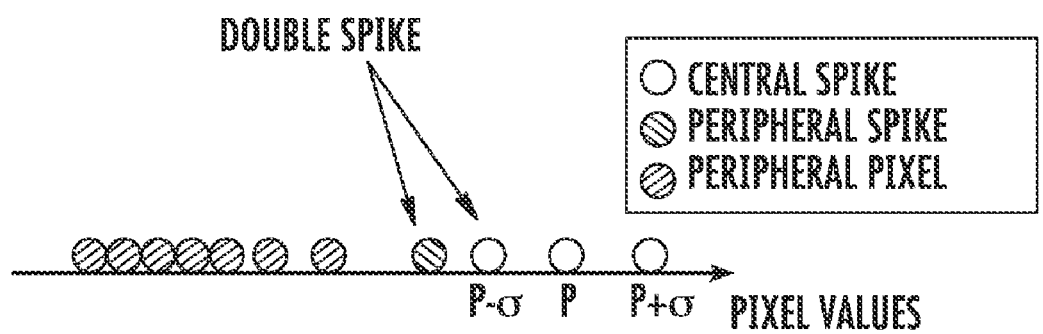
FIG. 18 is a diagram of intensities of pixels of FIG. 17.
Figure 19:
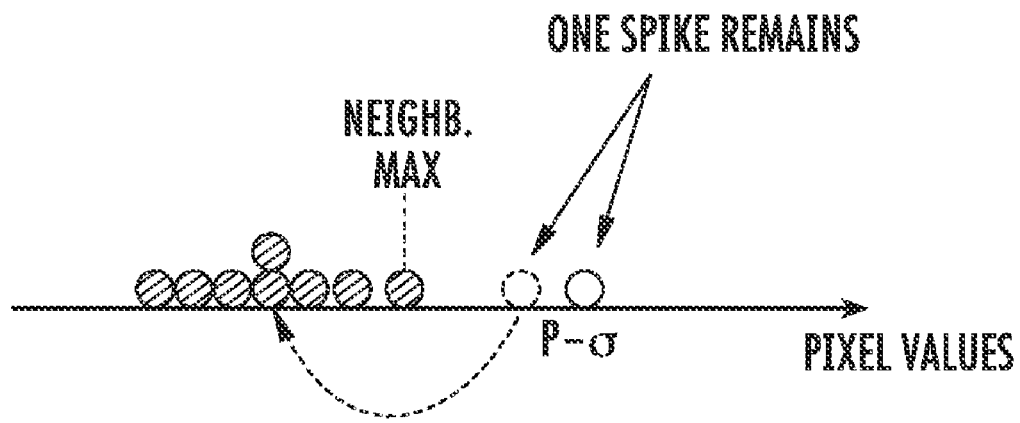
FIG. 19 is a diagram of the intensities of pixels of FIG. 17 after the spiked pixel of the peripheral pixels has been corrected.
Figure 20:
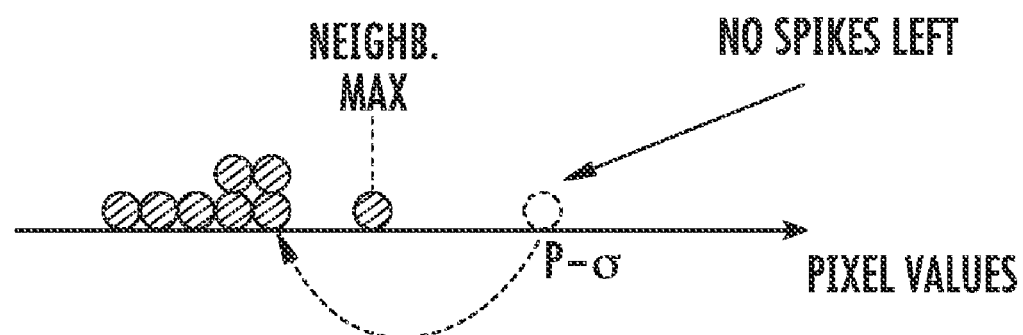
FIG. 20 is a diagram of the intensities of pixels of FIG. 17 after both the peripheral and central spiked pixels have been corrected.
Figure 21:
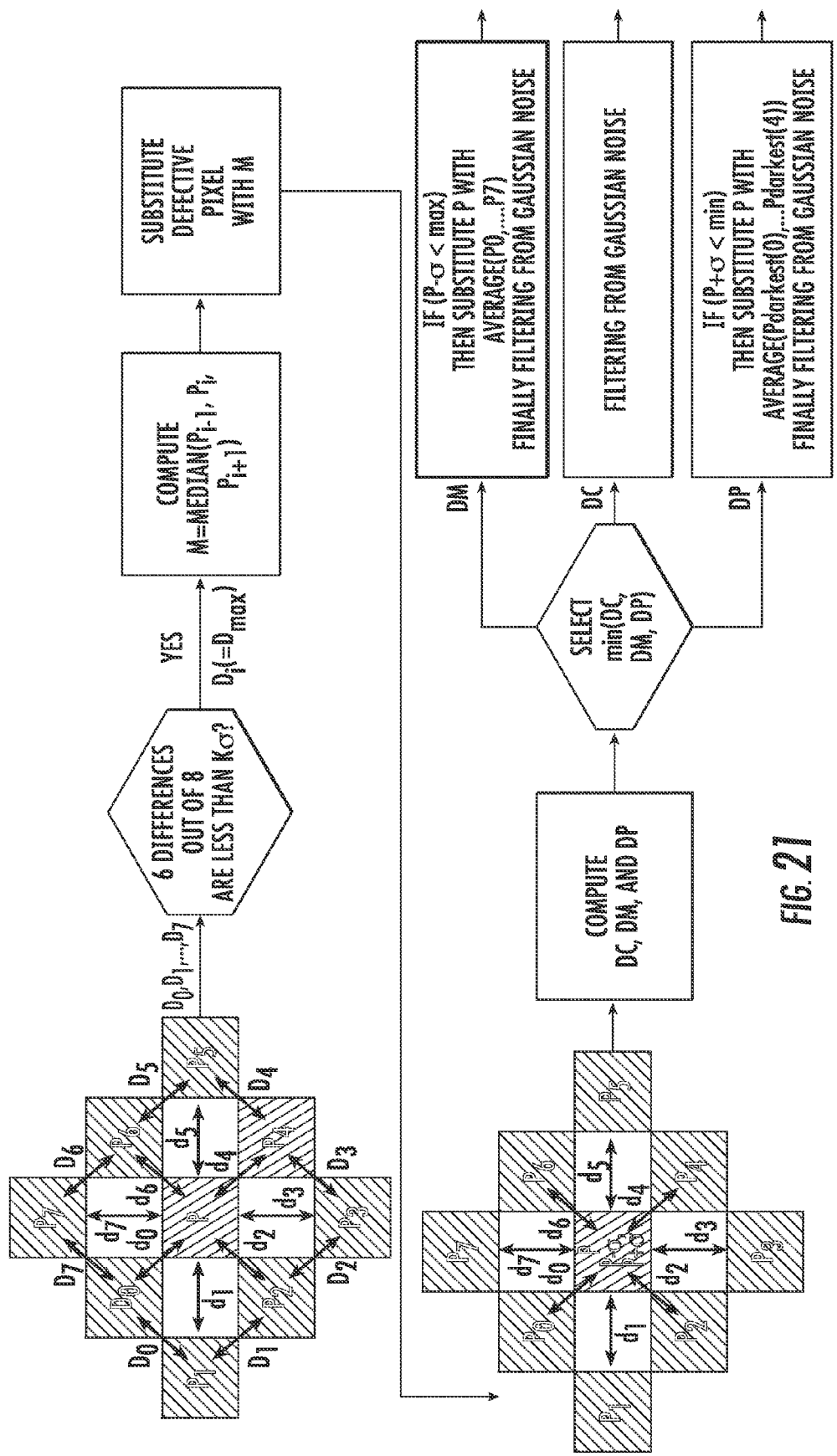
FIG. 21 is a flow-chart of a preferred embodiment of a method according to the invention for correcting defective pixels.

Similarly, FIGS. 18 to 20 describe method steps of the invention for correcting a central defective spiked pixel in the example of FIG. 17. A flow-chart of a preferred embodiment of the method of the invention is depicted in FIG. 21. Substantially, the following steps are performed:

scanning a pixel P to be processed;

choosing a set of pixels neighbor to it $P_0, \ldots, P_7$;

processing the peripheral pixels to seek defective pixels. If a defective pixel is found, estimating its intensity with the median intensity among the intensities of the neighbor pixels and the intensity of the pixel itself;

considering the central pixel P, which is the pixel to be corrected and filtered from noise, and its noise increased and decreased versions. Determining whether the central pixel is defective or not and eventually correcting its intensity; and finally, filtering from Gaussian noise the central pixel weighing the corrected intensities of the peripheral pixels with the weights $W_1, \ldots, W_3$ determined as shown above referring to the diagram of FIG. 10.

The values of the weights may vary depending on the specific filtering strength required. This method of the invention may be carried out in different alternative versions. In general, the pixels of an image to be processed are stored in an input memory buffer and the pixels of the processed image are stored in an output memory buffer. Each pixel is processed by selecting the pixels itself and pixels of the image neighbor to it.

According to a first version, referred to as a "recursive embodiment", each processed pixel is stored in the output buffer and is also overwritten in the input buffer over the corresponding non-processed pixel of the original image. According to a second version, referred to as "conditionally-recursive embodiment", the processed pixel is overwritten also in the input buffer only if the corresponding non-processed pixel has been identified as a defective pixel, otherwise it is simply stored in the output buffer.

Of course, it is possible to carry out the method of the invention in a "non-recursive" way, that is, without overwriting pixels in the input buffer even if they are recognized as defective.

A drawback of the recursive embodiment is that the edges of objects represented in the processed image result are less sharp than in an image processed with the conditionally-recursive embodiment. In contrast, the recursive embodiment seems to be more efficient in removing white tailed noise than the conditionally-recursive embodiment.

Figure 22:
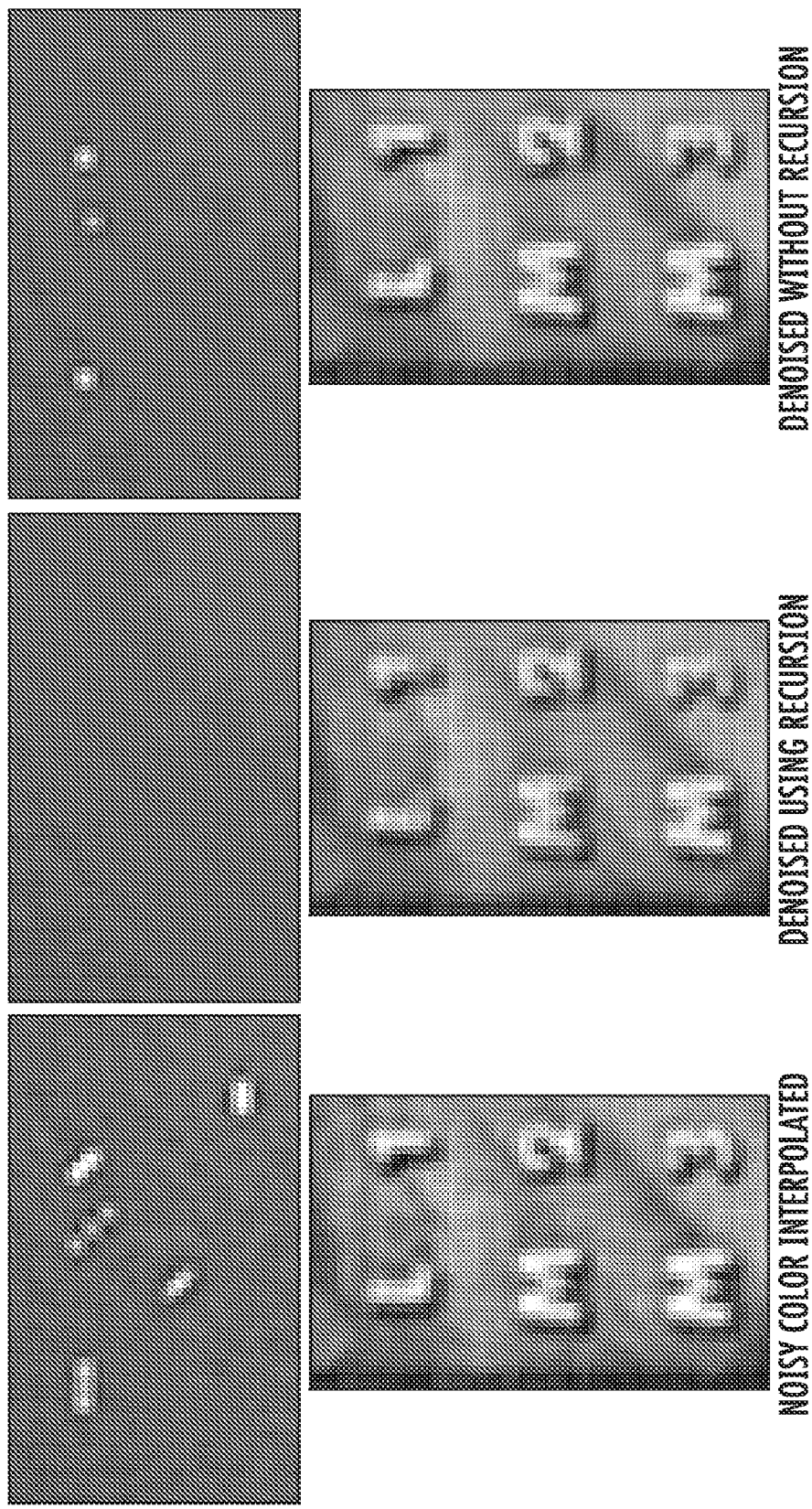
FIG. 22 compares results of a recursive version of a method for correcting defective pixels with a non-recursive version thereof according to the present invention.

FIG. 22 shows a noisy image and two corresponding images filtered with the recursive and conditionally-recursive embodiment of the method of the invention. Specifically, the left column shows a homogeneous area were three multiple instances of defective pixels are present (triplets in this case). The right column shows the results of the filter without recursion; two spikes are left after filtering. The central column demonstrates that with the recursive embodiment it is possible to remove all the spikes but loosing some sharpness of the edges of the letter "L" and the number "1".

Figure 23A:
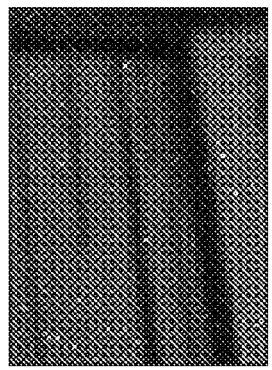
FIGS. 23a and 24a show two noisy Bayer images according to the present invention.
Figure 23B:
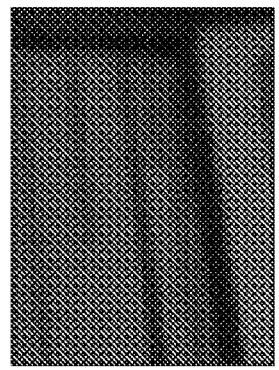
FIGS. 23b and 24b respectively show filtered versions of the images of FIGS. 23a and 24a with the method of the invention for correcting defective pixels.
Figure 24A:
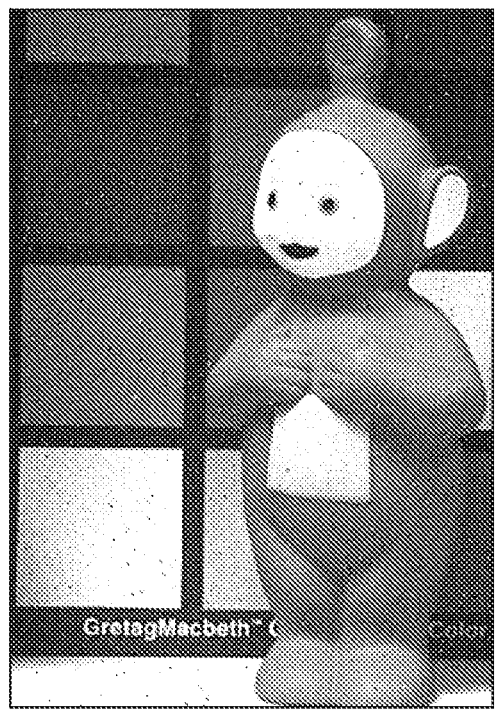
Figure 24B:
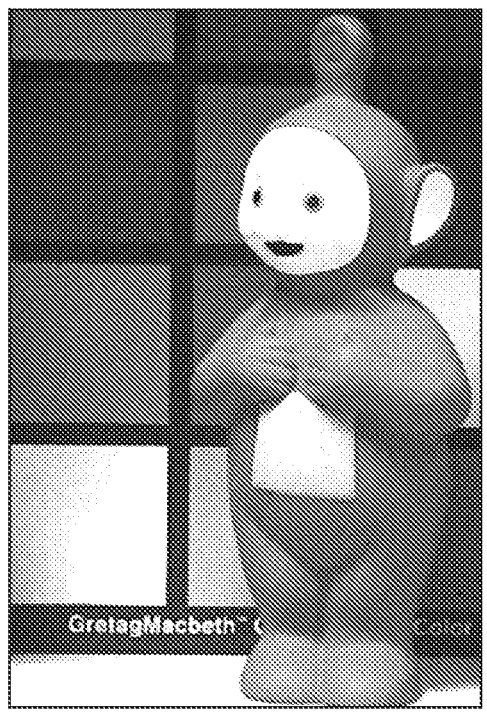
Figure 25:
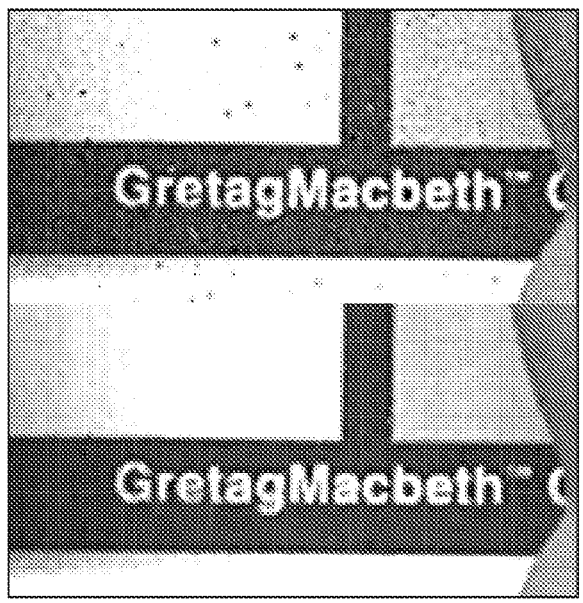
FIG. 25 compares portions of the images of FIGS. 24a and 24b.

To assess the filtering procedure, a very noisy and defective Bayer pattern was fed in input to the proposed filtering algorithm. FIG. 23 shows the results in the case of Gaussian noise and single and double spiked pixels.

FIGS. 23a, 23b, 24a, 24b and 25 show the results of the method of the invention for correcting defective pixels and noise filtering. It is evident that defective pixels are removed and details are preserved as much as possible.

Figure 27:
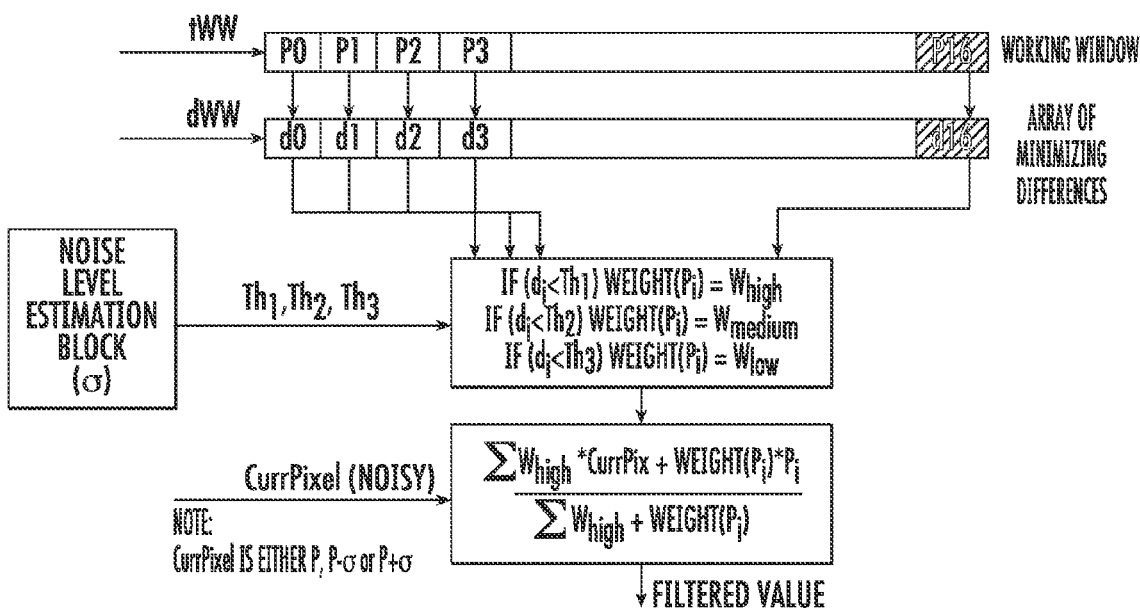
FIG. 27 shows a hardware device for implementing a method for filtering noise according to the present invention.

The methods of the invention are preferably performed with a software computer program. A hardware device for filtering a pixel from Gaussian noise is shown in FIG. 27 and is described in detail in the ensuing paragraph.

The invention also provides a novel method of filtering noise from a set of pixels of images of a sequence of images. Method of filtering noise from digital images of a image sequence are described in published European patent applications EP 1,100,260 and EP 1,394,742 which are assigned to the current assignee of the invention and are also incorporated herein by reference in their entirety.

According to the methods described in the cited applications, a working window of pixels to be filtered is chosen by selecting a noisy pixel to be filtered P of a current picture of a sequence of pictures and a set of spatially or temporally neighbor pixels of the same or of another picture of the sequence, respectively. The absolute value of the difference between the intensities of the noisy pixel P, of a noise reduced version thereof P−σ and of a noise increased version thereof P+σ with each of the neighbor pixels are calculated.

Each of these differences is compared with different thresholds, for example, a small threshold $Th_1$, a medium threshold $Th_2$ and a large threshold $Th_3$. Depending on this comparison, a respective weight $W_1, \ldots, W_3$ or a null weight is assigned to each neighbor pixel. Then first, second and third weighted sums of intensities of the pixel P, P−σ or P+σ, respectively, and of the neighbor pixels are calculated using the weights assigned to them, and the largest of these sums is chosen. Finally, the filtered intensity of the pixel P is determined as the ratio between the largest sum and the sum of the weights used for calculating this sum.

The methods disclosed in the cited prior applications are time consuming because all the above mentioned differences must be compared with all the thresholds.

According to a preferred embodiment of the method of the invention for filtering noise from a selected set of pixels of an image, a first DC, second DM and third DP sum of the absolute values of the differences between the intensities of the pixel P, P−σ or P+σ, respectively, with the intensities of the neighbor pixels are calculated, and the smallest of these sums is chosen. Then only the absolute values of the differences used for obtaining the smallest sum are compared with the thresholds $Th_1$, $Th_2$ and $Th_3$ in order to assign weights to each pixel.

In so doing, the number of comparisons with a threshold is strongly reduced with respect to the algorithm disclosed in the cited prior applications because these comparisons are performed after the intensity P, P−σ or P+σ has been chosen, thus the method of the invention for filtering noise is surely faster than the methods of the prior application.

This method of filtering noise is effective even if the pixel P and its neighbor pixels do not belong to the same image, but to consecutive images of an image sequence. It may be applied to any number of selected neighbor pixels of a noisy pixel P, and the intensity of the noise increased and decreased versions of the pixel P may be obtained by summing or subtracting a fraction or a multiple of the standard deviation σ of the noise corrupting the pixels of the set.

A sample embodiment of this method is given considering seventeen neighbor pixels $P_0, \ldots, P_{16}$ of a pixel P to be filtered from noise, chosen among pixels belonging to the same image of the pixel P and to images that precede or follow in a sequence of images.

Figure 26:
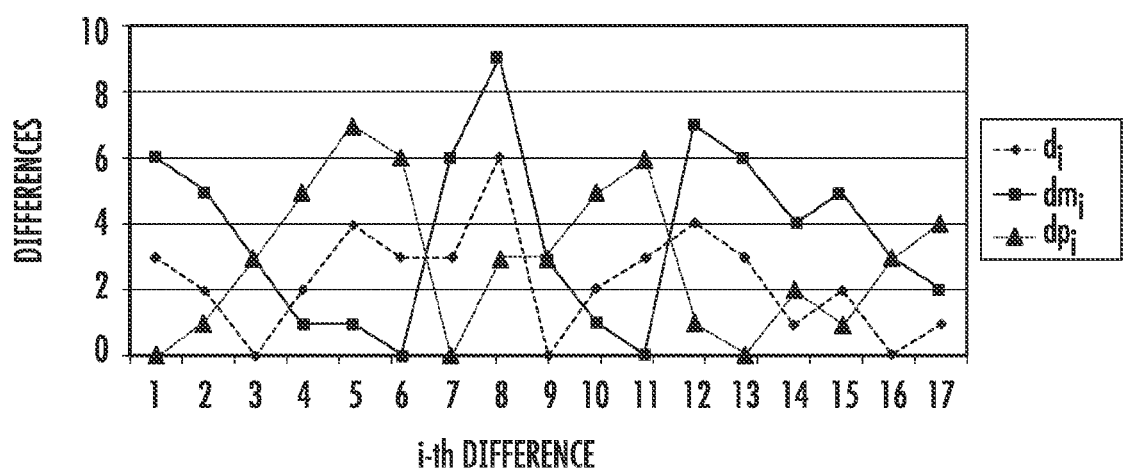
FIG. 26 shows a sample embodiment of a method for filtering noise according to the present invention.

FIG. 26 is a sample diagram of the differences of intensity $$d_i = |P - P_i|$$

$$dm_i = |(P-\sigma) - P_i|$$

$$dp_i = |(P+\sigma) - P_i|$$

According to the method of the invention, the sums $$DC = \sum_{i=0}^{16} d_i; \; DM = \sum_{i=0}^{16} dm_i; \; DP = \sum_{i=0}^{16} dp_i;$$

are calculated and the smallest of them is identified, which in the example of FIG. 26 is DC. Thus, the differences $d_i = |P-P_i|$ are compared with certain thresholds $Th_1$, $Th_2$ and $Th_3$ and a weight $W_1$, $W_2$, $W_3$ or 0 is assigned to each neighbor pixel $P_i$ depending on which is the smallest threshold larger than the difference $d_i$.

It is worth remarking that this method of filtering noise is effective even with a number of thresholds larger or smaller than three.

Finally, a noise filtered version of the pixel P is obtained by correcting the intensity of the pixel P with the weighted sum of intensities of the neighbor pixels, each with the respective weight determined at the previous step, and of the noisy pixel P itself.

Preferably, the intensity of the noisy pixel P is weighted with the largest available weight.

Preferred values of the weights are:

$W_1=8; W_2=2; W_3=1.$ while preferred values of the thresholds are:

$Th_1=\sigma; Th_2=2*\sigma; Th_3=3*\sigma.$

As an alternative, it is possible to select even more than three thresholds and assign them other values, but this approach makes the method computationally heavier without producing noticeable improvements in the quality of the final image.

A hardware device for calculating the intensity value of a noise filtered pixel is shown in FIG. 27.

A memory buffer tWW stores the intensities of spatially or temporally neighbor pixels of a noisy pixel P to be filtered. A computing unit (not shown in the FIG.) calculates which of the sums DC, DM or DP is the smallest one, and stores in a second memory buffer dWW the differences related to this smallest sum, which in the sample case of FIG. 27 are the differences $d_i$, using the values stored in the buffer tWW.

A noise estimation block evaluates the standard deviation σ of the noise level corrupting the selected pixels and generates a certain number of thresholds, that in the sample embodiment of FIG. 7 are the three thresholds $Th_1$, $Th_2$ and $Th_3$. An output computation circuit compares each of these differences with the thresholds, identifies for each difference the smallest threshold larger than the considered difference and generates the intensity of the noise filtered pixel P as a weighted sum of the intensities of the noisy pixel P and of its neighbor pixels $P_i$.

This method is preferably implemented with a software computer program performing the method steps previously described when run on a computer.

REFERENCES

[1] B. E. Bayer, "Color Imaging Array", U.S. Pat. No. 3,971,065.
[2] A. Bosco, M. Mancuso, S. Battiato, G. Spampinato, "Adaptive Temporal Filtering For CFA Video Sequences", Proceedings of IEEE Acivs (Advanced Concepts for Intelligent Vision Systems) 2002.
[3] A. Bosco, M. Mancuso, S. Battiato, G. Spampinato "Temporal Noise Reduction Of Bayer Matrixed Video Data", Proceedings of IEEE ICME (International Conference on Multimedia and Expo) 2002.
[4] A. Bosco, M. Mancuso, "Adaptive Filtering For Image Denoising", in IEEE Proceedings of ICCE 2001, pp. 208-209, June 2001.
[5] A. M. Borneo, L. Salinari, D. Sirtori, "An Innovative Adaptive Noise Reduction Filter for Moving Pictures Based on Modified Duncan Range Test", ST-Journal of System Research, Vol. 1, No. 1, 2000.
[6] G. Cortellazzo, G. A. Mian, R. Parolari, "Statistical Characteristics of Granular Camera Noise", IEEE Transactions On Circuits and Systems For Video Technology, Vol. 4, No. 6, December 1994.

[7] A. Bosco, K. Findlater, S. Battiato, A. Castorina, "A Noise Reduction Filter for Full-Frame Data Imaging Devices", Transactions on Consumer Electronics, Vol. 49, No. 3, August 2003.

[8] A. M. Borneo, L. Salinari, "Spatio-temporal filtering method for noise reduction during pre-processing of picture sequences in video encoders", European Patent Application EP 1,100,260.

[9] A. Bosco, S. Battiato, "Method for filtering the noise of a digital image sequence", European Patent Application EP 1,394,742.

That which is claimed is:

1. A method for filtering a noisy pixel comprising:
   a) selecting a set of pixels neighboring the noisy pixel;
   b) determining if the noisy pixel is a defective pixel, and if defective, then correcting by performing at least the following
      calculating an absolute value in differences of intensity for pairs of neighboring pixels,
      comparing the absolute values to a threshold,
      excluding a presence of each defective pixel when no more than one of the absolute values is larger than the threshold, otherwise deciding whether or not there is a defective pixel as a function of the comparing,
      selecting eight peripheral pixels and a central pixel of the image with the set of pixels comprising the eight peripheral pixels,
      deciding if the central pixel is defective by performing at least the following
         i) correcting each defective peripheral pixel by substituting its intensity based upon an intensity of at least one of its neighboring pixels, or by substituting intensities of two pixels used for identifying a largest absolute value of the differences of the two pixels used,
         ii) deciding which among the intensities of the central pixel or of a noise affected version thereof is closest to the intensities of the corrected peripheral pixels,
         iii) if the noise affected version has been chosen, verifying whether it is darker than a darkest of the corrected peripheral pixels or brighter than a brightest of the corrected peripheral pixels, respectively,
         iv) if the condition at the previous point is verified, then identifying the central pixel as a defective pixel, and
         v) correcting the central pixel if defective by substituting its intensity with the intensity of the corrected version of one of the peripheral pixels belonging to the set of pixels or with a combination of the intensities thereof;
   c) assigning a weight to each neighboring pixel as a function of the absolute value of the difference between its intensity and the pixel intensity chosen in step iv); and
   d) generating the intensity of a corrected and noise filtered replica of the noisy pixel as the weighted sum of the intensities of the neighboring pixels, weighted with the weights, and the intensity of the noisy pixel weighted with the largest of the weights.

2. A method of generating a reduced defect digital image from a defective image comprising:
   a) scanning pixels of the defective image;
   b) for each scanned pixel, using a selection window for selecting a set of pixels that are neighbors to a scanned pixel;
   c) determining if there is a defective pixel among the neighboring pixels by performing at least the following
      calculating an absolute value in differences of intensity for pairs of neighboring pixels,
      comparing the absolute values to a threshold,
      excluding the presence of each defective pixel when no more than one of the absolute values is larger than the threshold, otherwise deciding whether or not there is a defective pixel as a function of the comparing, and
      correcting a defective pixel by substituting its intensity based upon the intensity of at least one pixel belonging to the set of pixels;
   d) determining whether a currently scanned pixel is defective by performing at least the following
      selecting eight peripheral pixels and a central pixel of the image using a window, with the set of pixels comprising the eight peripheral pixels,
      deciding if the central pixel is defective by performing the following
         i) correcting each defective peripheral pixel by substituting its intensity based upon an intensity of at least one of its neighboring pixels, or by substituting intensities of two pixels used for identifying a largest absolute value of the differences of the two pixels used,
         ii) deciding which among the intensities of the central pixel or of a noise affected version thereof is closest to the intensities of the corrected peripheral pixels,
         iii) if the noise affected version has been chosen, verifying whether it is darker than a darkest of the corrected peripheral pixels or brighter than a brightest of the corrected peripheral pixels, respectively, and
         iv) if the condition at the previous point is verified, then identifying the central pixel as a defective pixel; and
   e) generating a pixel of the reduced defect image by correcting the currently scanned pixel by correcting the central pixel if defective by substituting its intensity with the intensity of the corrected version of one of the peripheral pixels belonging to the set of pixels or with a combination of the intensities thereof.

3. A method according to claim 2, further comprising overwriting a defective pixel in the defective image with the corresponding reduced defect version before scanning a successive pixel of the defective image.

4. A method according to claim 2, further comprising overwriting a defective pixel of the defective image with the corresponding noise filtered and reduced defect version before scanning a successive pixel of the defective image.

5. A method according to claim 2, wherein the defective image is an image of a succession of images and the neighboring pixels are selected from one of the same image, a previous, and a successive image of the sequence and are spatially or temporally neighbors to the currently scanned pixel.

6. A method for filtering a noisy pixel in a digital image that is part of a sequence of digital images, the method comprising:
   a) selecting the noisy pixel and a set of pixels of one of the same digital image, a previous, and a successive digital image of the sequence that are spatially or temporally neighboring to the noisy pixel;
   b) identifying which intensity between the intensity of the noisy pixel and of a noise affected version thereof is the closest to the intensities of the neighboring pixels;
   c) assigning a weight to each neighboring pixel as a function of the absolute value of the difference between its intensity and the intensity of the pixel identified at step b); and
   d) generating the intensity of a noise filtered replica of the noisy pixel as the weighted sum of the intensities of the neighboring pixels, weighted with the weights, and the intensity of the noisy pixel weighted with the largest of the weights;

wherein step b) comprises at least the following calculating a sum of the absolute values of the differences between the intensity of the noisy pixel and each of the neighboring pixels, calculating another sum of the absolute values of the differences between the intensity of the noise increased or decreased version of the noisy pixel and each of the neighboring pixels, and identifying the pixel among the noisy pixel and of a noise increased or decreased version thereof for which the respective value of the sums is minimum.

7. A method according to claim 6, wherein step b) is performed by processing the intensity of the noisy pixel, the intensities of the noise affected version, the intensity of the noisy pixel by the standard deviation, a fraction or a multiple thereof of the noise corrupting the pixels of the set.

8. A method according to claim 6, wherein the calculating, comparing and excluding are implemented via a software code for being executed on a computer.

9. A method for filtering at least one pixel in a set of pixels from a digital image, with the set of pixels being two-dimensional and with each pixel having neighboring pixels belonging to the set of pixels, the method comprising:

selecting from the digital image a plurality of peripheral pixels and a central pixel for analysis using a window;

analyzing the selected pixels within the window based on at least the following calculating an absolute value in differences of intensity for pairs of neighboring pixels, with the pairs of neighboring pixels being two-dimensional, comparing the absolute values to a threshold, and excluding a presence of each potentially defective pixel when no more than one of the absolute values is larger than the threshold, otherwise deciding whether or not there is a defective pixel as a function of the comparing; and filtering the at least one pixel based on the analyzing.

10. A method according to claim 9, wherein the window has a diamond or rectangular shape.

11. A method according to claim 9, further comprising asserting the presence of at least one defective pixel when the absolute value of two differences involving the intensity of a same pixel exceeds the threshold.

12. A method according to claim 9, wherein the threshold is based upon an estimated standard deviation of noise corrupting the pixels of the set.

13. A method according to claim 12, wherein the threshold is four times the estimated standard deviation of noise.

14. A method according to claim 9, wherein the window comprises eight peripheral pixels and the central pixel from the digital image.

15. A method according to claim 9, further comprising deciding that no pixel of the set of pixels is defective if a percentage of the absolute differences surpassing the threshold exceeds a certain value.

16. A method according to claim 15, wherein the set of pixels comprises eight pixels, and further comprising deciding that no pixel is defective when more than two of the differences out of the eight pixels are larger than the threshold.

17. A method according to claim 9, further comprising identifying a pixel from the set of pixels as a defective pixel when the absolute values of both the differences between its intensity and the intensity of one of the other neighboring pixels from the set of pixels surpass the threshold.

18. A method according to claim 9, further comprising:
if at least one defective pixel is present, then identifying a largest absolute value of the differences and the two pixels used for calculating it; and
substituting the intensities of the two pixels with a median intensity among the intensities of the two pixels and of a neighboring pixel.

19. A method according to claim 18, further comprising correcting the defective pixel by substituting its intensity with the intensity of one of the two neighboring pixels belonging to the set of pixels or with a combination of the intensities thereof.

20. A method according to claim 9, wherein the intensity of the defective pixel is substituted with the median intensity among the two neighboring pixels and the defective pixel itself.

\* \* \* \* \*

UNITED STATES PATENT AND TRADEMARK OFFICE
CERTIFICATE OF CORRECTION

| | | |
|---|---|---|
| PATENT NO. | : 7,876,972 B2 | Page 1 of 1 |
| APPLICATION NO. | : 12/542740 | |
| DATED | : January 25, 2011 | |
| INVENTOR(S) | : Bosco et al. | |

It is certified that error appears in the above-identified patent and that said Letters Patent is hereby corrected as shown below:

| | |
|---|---|
| Column 1, Line 49 | Delete: "pixels"<br>Insert: --pixel-- |
| Column 1, Line 65 | Delete: "referred as"<br>Insert: --referred to as-- |
| Column 2, Line 30 | Delete: "as normal"<br>Insert: --as a normal-- |
| Column 5, Line 10 | Delete: "referred as"<br>Insert: --referred to as-- |
| Column 5, Line 12 | Delete: "as"<br>Insert: --to as-- |
| Column 6, Line 15 | Delete: "among in"<br>Insert: --among-- |
| Column 7, Line 10 | Delete: "(that are"<br>Insert: --(that is-- |
| Column 8, Line 14 | Delete: "pixels is"<br>Insert: --pixels are-- |
| Column 10, Line 35 | Delete: "were"<br>Insert: --where-- |
| Column 10, Line 40 | Delete: "loosing"<br>Insert: --lose-- |

Signed and Sealed this
Sixteenth Day of August, 2011

David J. Kappos
*Director of the United States Patent and Trademark Office*